United States Patent [19]
Major

[11] 3,888,344
[45] June 10, 1975

[54] ACCUMULATING CONVEYOR WITH ARTICLE POSITION SENSORS AND ARTICLE MOVEMENT SENSORS CONTROLLING THE PUSHER MEMBER

[75] Inventor: Harry Major, Grosse Pointe Woods, Mich.

[73] Assignee: Harry Major Machine & Tool Co., Warren, Mich.

[22] Filed: Nov. 23, 1973

[21] Appl. No.: 418,437

[52] U.S. Cl. .............................. 198/219; 198/221
[51] Int. Cl. ............................................ B65g 25/04
[58] Field of Search ............ 198/221, 19, 34, 7372, 198/7950, 7954, 219, 218, 127, 20 R, 24, 168, 170, DIG. 19

[56] References Cited
UNITED STATES PATENTS

| | | |
|---|---|---|
| 3,385,418 | 5/1968 | Broser .............................. 198/221 |
| 3,477,560 | 11/1969 | Broser .............................. 198/218 |
| 3,545,600 | 12/1970 | Rudlaff ............................ 198/221 |
| 3,547,254 | 12/1970 | Manetta ........................... 198/221 |
| 3,557,943 | 1/1971 | Broser .............................. 198/221 |

Primary Examiner—Richard A. Schacher
Assistant Examiner—James M. Slattery
Attorney, Agent, or Firm—Burton & Parker

[57] ABSTRACT

An accumulating type conveyor having a plurality of article supporting stations spaced therealong and pusher member for transferring the articles in step-by-step progression along the conveyor and into a processing machine or the like. The conveyor includes a control system including article position sensors and article movement sensors, together with a cam member for each pusher member selectively operable to shift the pusher member to its non-article engaging position, whereby the flow of articles to the processing machine is automatically controlled.

9 Claims, 14 Drawing Figures

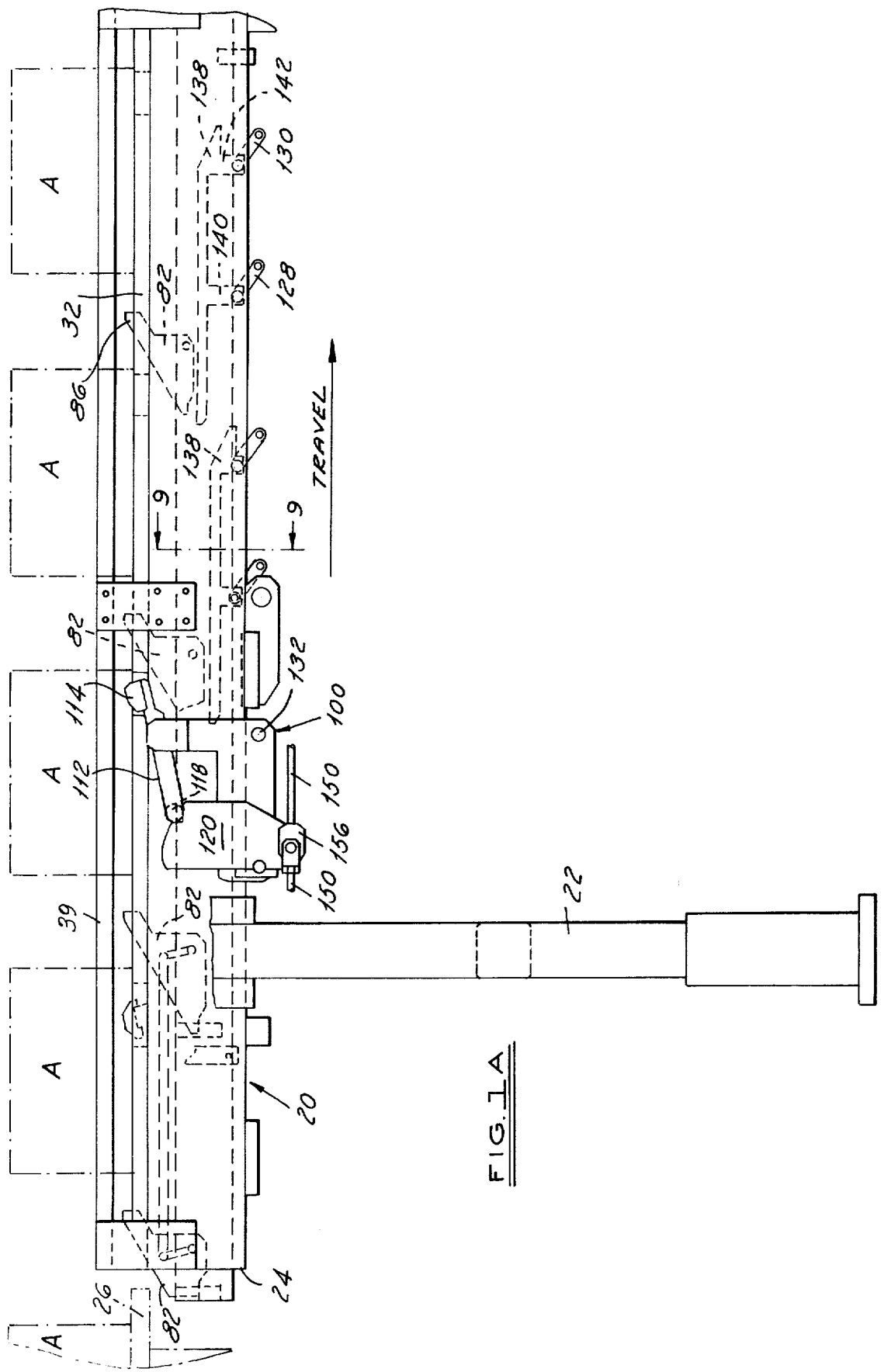

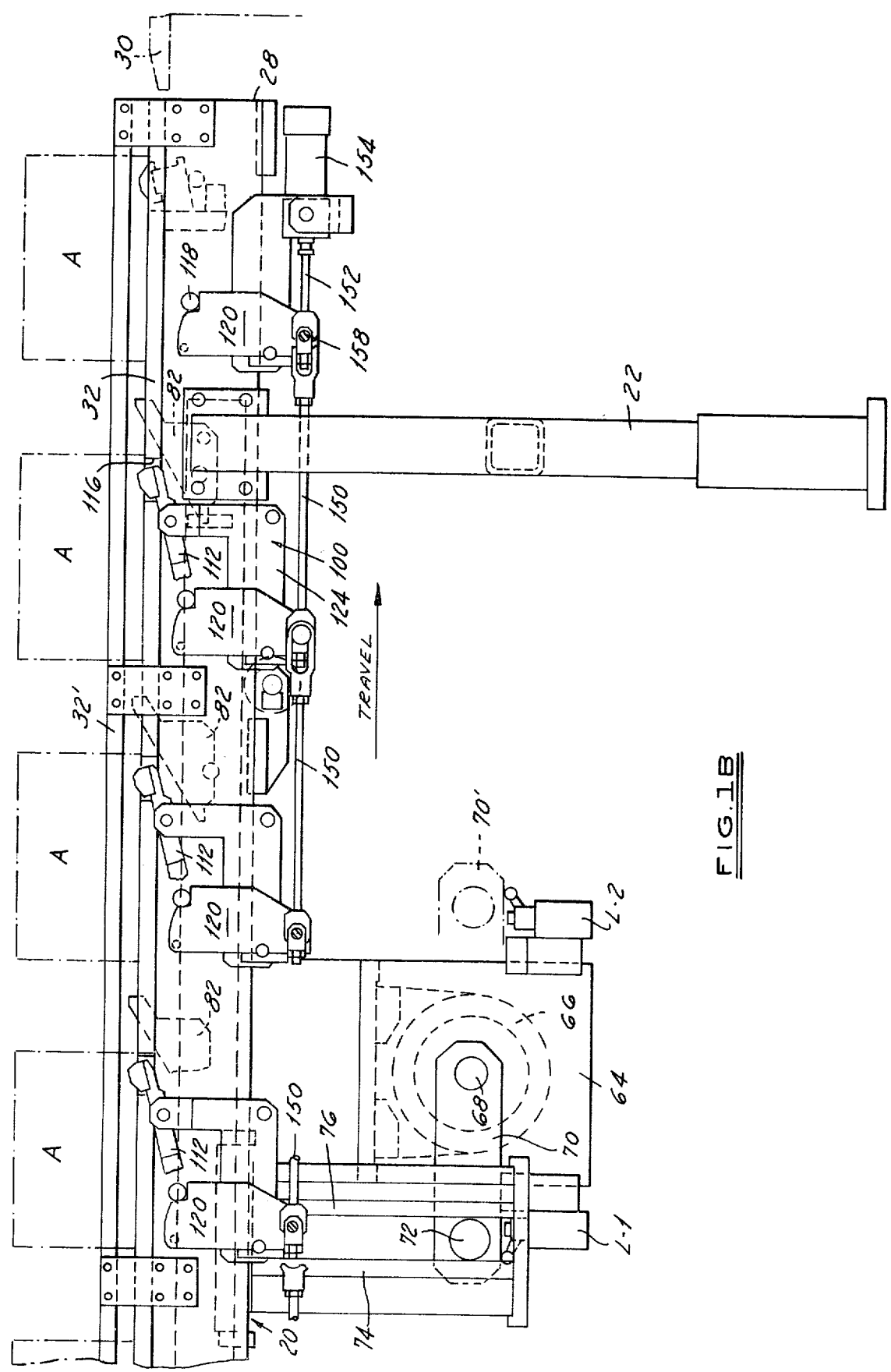

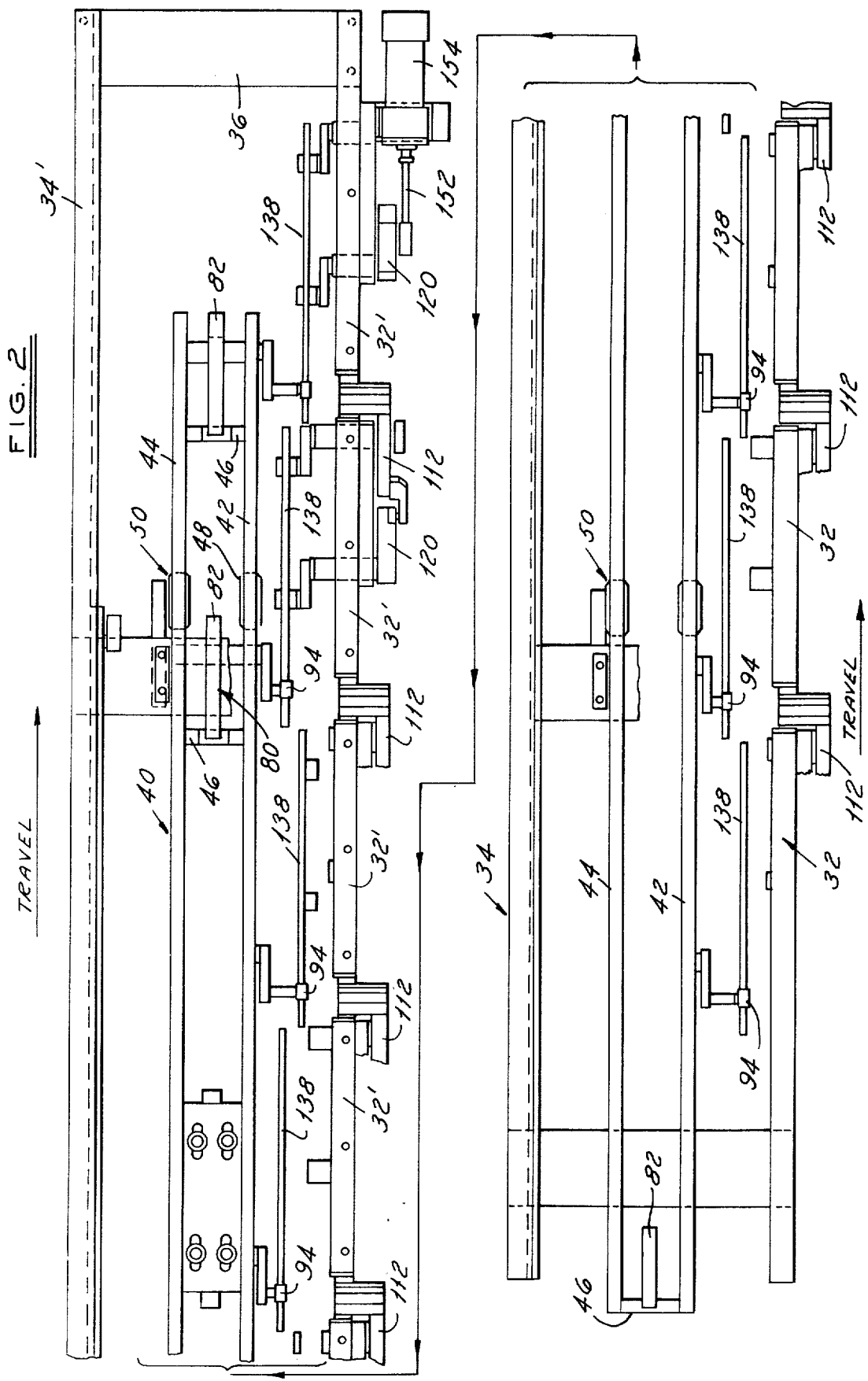

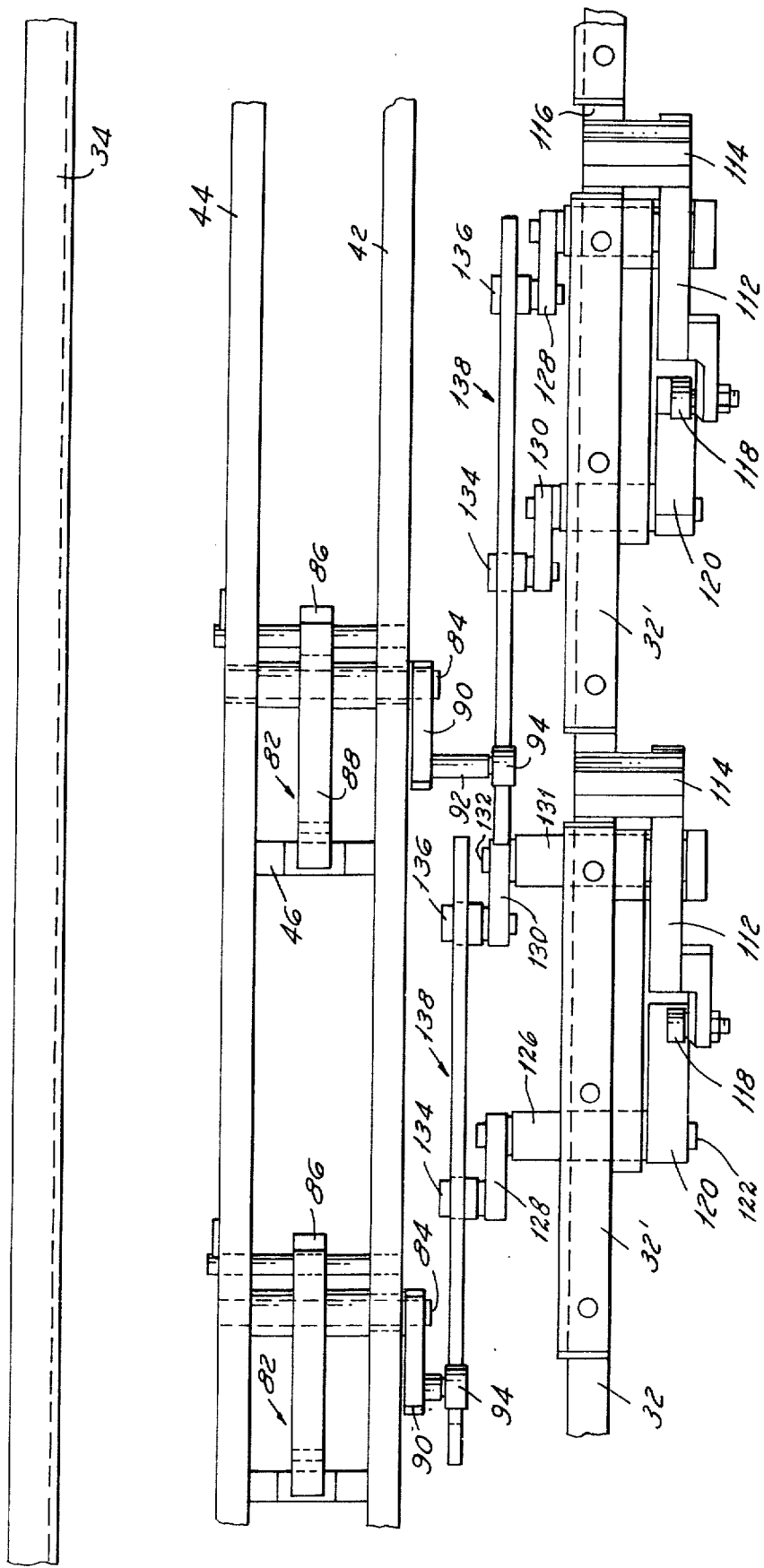

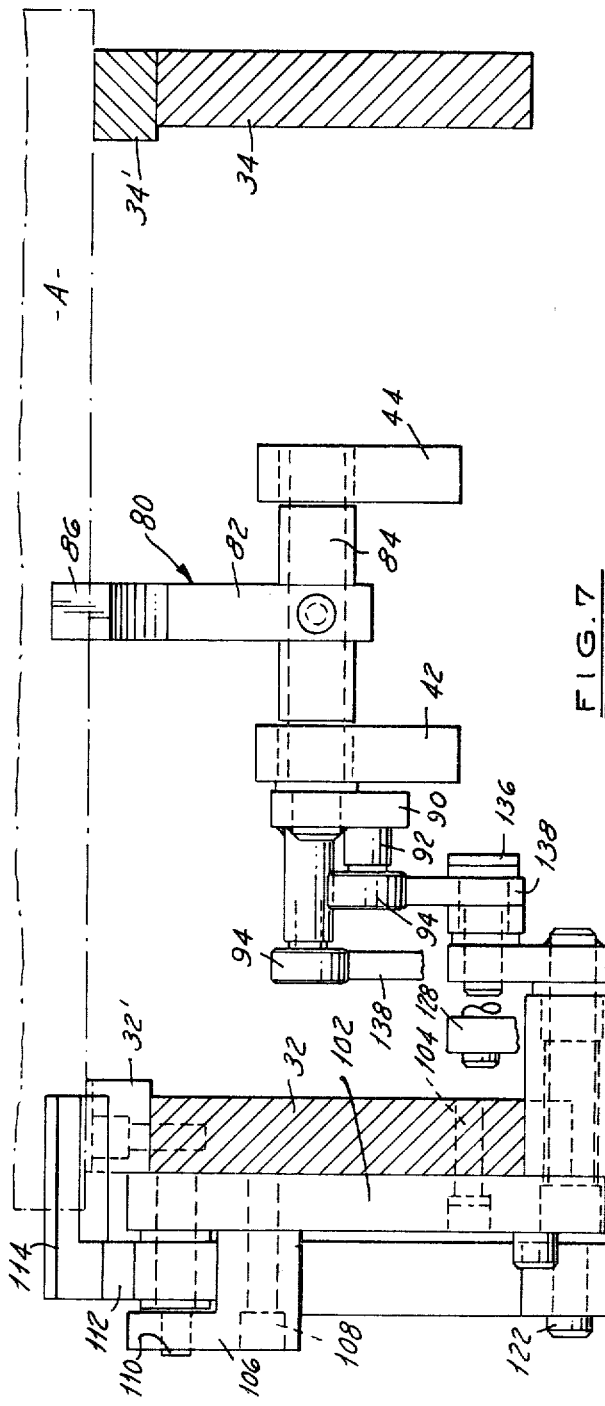
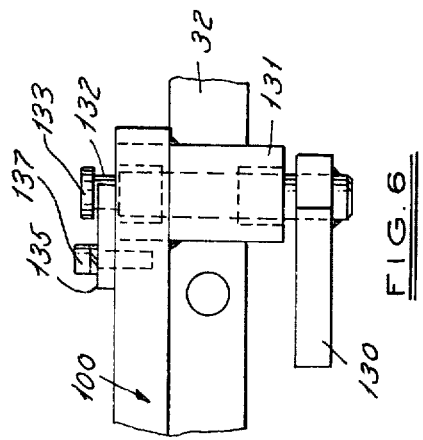
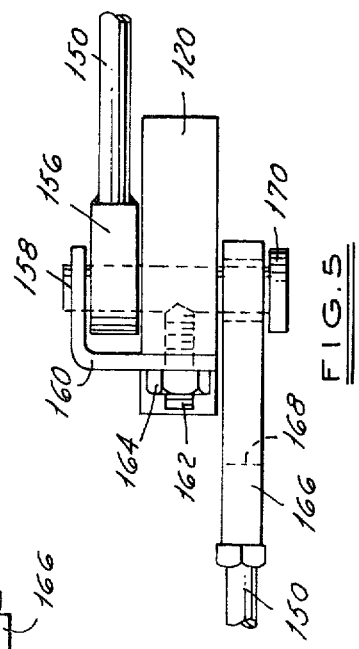

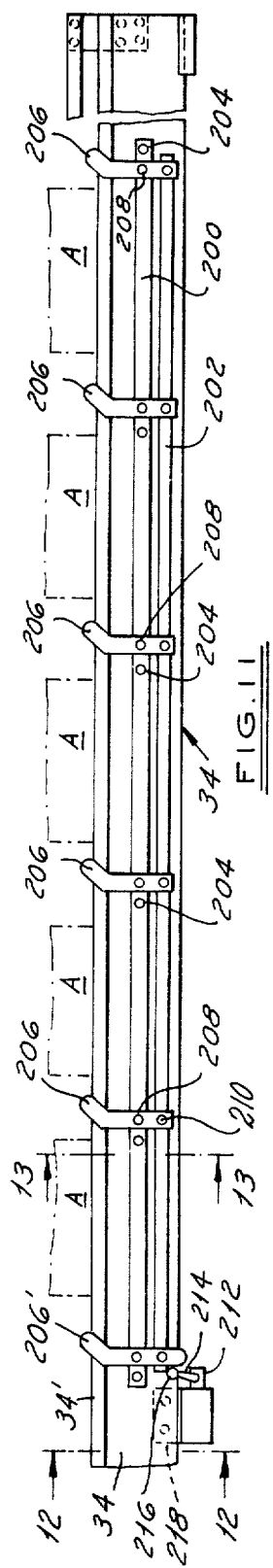
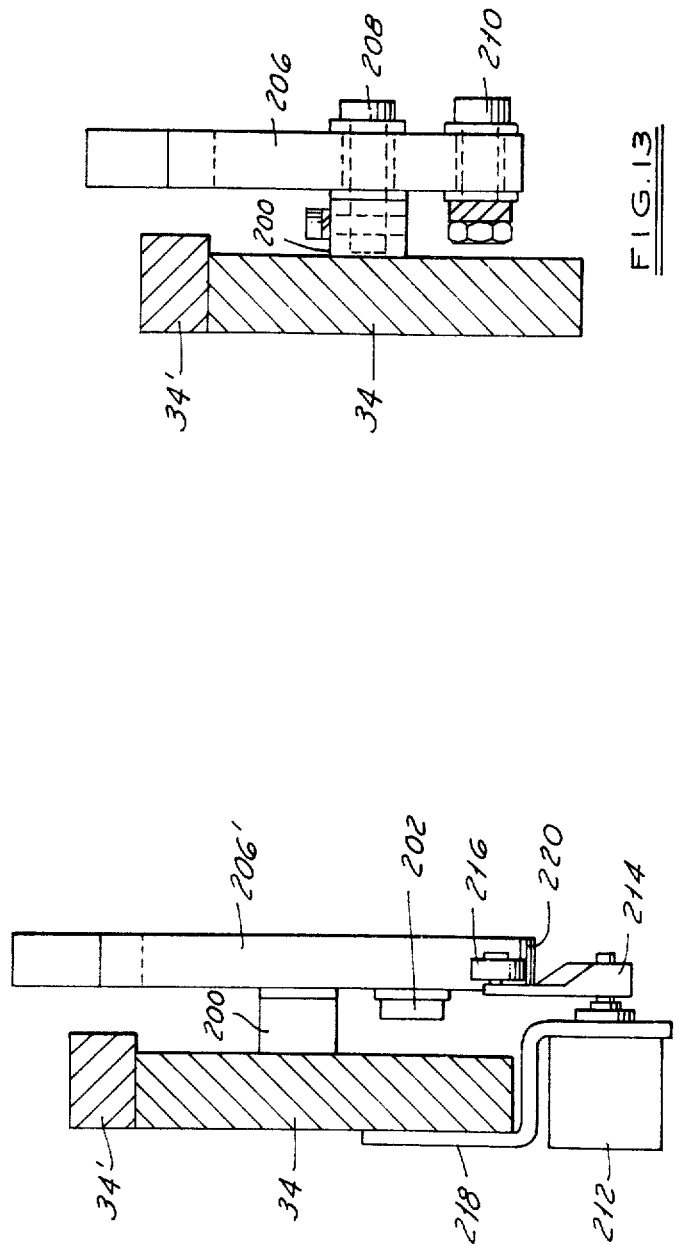

3,888,344

ACCUMULATING CONVEYOR WITH ARTICLE POSITION SENSORS AND ARTICLE MOVEMENT SENSORS CONTROLLING THE PUSHER MEMBER

BACKGROUND OF THE INVENTION

1. Field of the Invention

The present invention lies generally in the field of conveyors, and more particularly relates to a conveyor for delivering a constant supply of articles to a processing machine or the like. The conveyor is provided with mechanical controls which insure a constant flow of articles along the conveyor during operation of the processing machine, and operable to automatically shut down the conveyor when it is filled with articles and the processing machine is inoperative.

2. Description of the Prior Art

Accumulating conveyors of the general type shown in the application are old in the art. Exemplary of such conveyors are U.S. Pat. Nos. 3,127,981; 3,289,821; 3,322,259; 3,355,008 and 3,385,418. The prior art devices such as are shown in the above patents have often employed sensing devices and control mechanism operable to keep the conveyor full of articles being transferred, and also to provide a steady flow of articles to the processing machine or whatever. Some of the prior art conveyors have used fairly complicated electrical sensing devices and controls, while others have relied upon pneumatically powered devices, while still others have relied upon a combination electrical and pneumatic power control system. Such prior art systems have been complicated, and more importantly, have been subject to failure and malfunction, with resultant possibility of damage to articles being conveyed, which articles are frequently expensive.

SUMMARY OF THE INVENTION

An accumulating conveyor mechanism including a plurality of article stations and pusher members for transferring articles between said stations. At each station there is an article position sensing means coupled to a cam means which is operable to shift the associated pusher member to a non-article engaging position, with the article position sensors being interconnected in such fashion that the conveyor is kept full of articles assuming an available supply of articles, and continued operation of the processing machine to which the articles are being fed. Article movement sensing mechanism is also provided to shut down the conveyor automatically in the event no article is transferred during any given cycle.

With the processing machine in operation, and the conveyor filled with articles, the conveyor will operate cyclically to feed successive articles to the processing machine. In the event the processing machine is shut down or inoperative for any reason, the conveyor will automatically cease operation unless one or more conveyor stations are without articles, in which event the conveyor will continue to operate to selectively move articles until all stations are filled, after which the conveyor will automatically shut down. Except for a small number of electric limit switches for controlling the drive motor, the conveyor is completely controlled by means of strictly mechanical devices which are substantially foolproof and not subject to the failure problems present with more complicated and sophisticated control systems heretofore known.

BRIEF DESCRIPTION OF DRAWINGS

FIGS. 1A and 1B are side elevations of an accumulating conveyor embodying the invention showing respectively the upstream end and the downstream end of the conveyor;

FIG. 2 is a top elevation of the conveyor shown in FIGS. 1A and 1B;

FIG. 4 is a partial enlarged top elevation of the conveyor showing details of construction;

FIG. 5 is a partial bottom elevation taken in the direction of the arrows 5—5 in FIG. 3;

FIG. 6 is a partial bottom elevation taken in the direction of the arrows 6—6 of FIG. 3;

FIG. 7 is a cross-section taken substantially along the line 7—7 of FIG. 3;

FIG. 11 is a partial side elevation of one conveyor rail showing an article movement sensing device mounted thereon; and FIGS. 12 and 13 are cross-sections taken along the lines 12—12 and 13—13 respectively of FIG. 11.

DESCRIPTION OF THE PREFERRED EMBODIMENT

Referring now more particularly to the drawings, there is shown in FIGS. 1A, 1B and 2 a conveyor of the type commonly referred to as an accumulating conveyor having a main frame generally indicated at 20 supported on columns or the like, two of which are shown at 22 in FIGS. 1A and 1B. The upstream end of the conveyor shown at 24 in FIG. 1A is positioned to receive articles labelled A from a suitable source shown in phantom outline at 26, the character of which forms no part of the instant invention. The downstream end of the conveyor 28 shown in FIG. 1B communicates with a processing machine or the like, a portion of which is shown at 30 in phantom outline in FIG. 1B.

Figure 8:
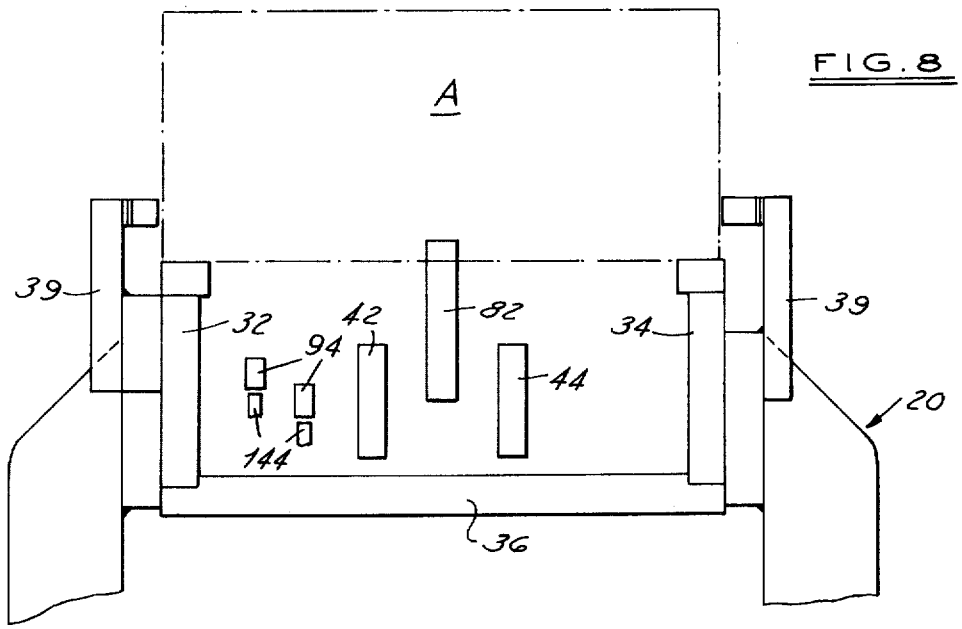
FIG. 8 is a schematic end elevation of the conveyor.
Figure 9:
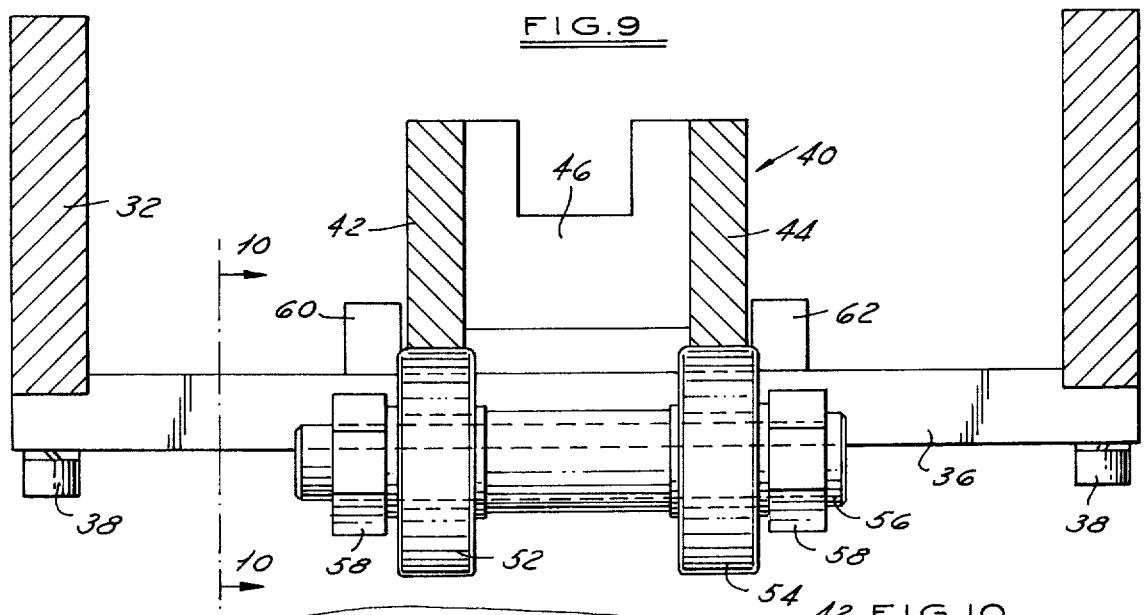
FIG. 9 is a cross-section through the conveyor showing the article support means and the carriage supported for shiftable movement along the conveyor.
Figure 10:
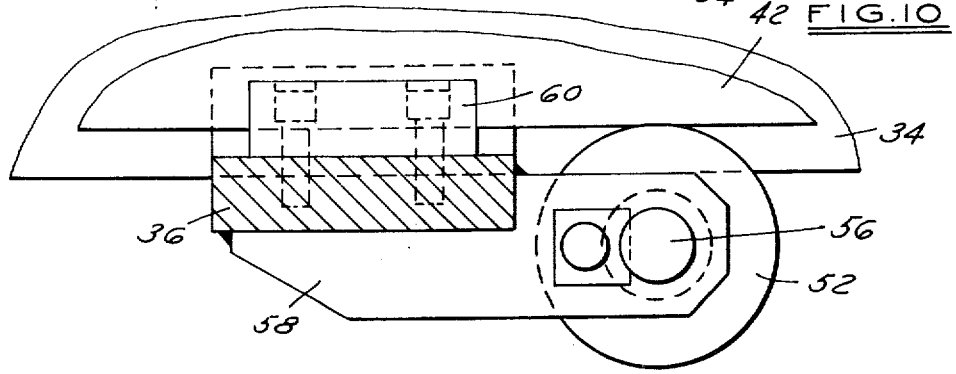
FIG. 10 is a partial section taken along the line 10—10 of FIG. 9.

The articles A which are shown in phantom in the drawings are supported on a pair of longitudinally extending rails 32 and 34 which are fixed to the machine frame 20. As shown most clearly in FIG. 9, the rails 32 and 34 may be conveniently secured to the frame as by being bolted to a frame cross member 36 by means of bolts 38. The rails may be constructed with wear resistant strip portions 32' and 34' fixed to their top surfaces as shown. A pair of guide bars or rails 39 (FIG. 8) are provided running along opposite sides of the articles A to keep them in proper position as they are transferred along the conveyor. Supported centrally between the article supporting rails 32 and 34 is a transfer carriage 40, the carriage comprising a pair of spaced vertical side walls 42 and 44 secured together along their length by spaced apart web members 46, one of which is shown in FIG. 9. The carriage 40 is supported for limited reciprocable movement on a plurality of roller assemblies, two of which are shown at 48 and 50 in FIG. 2 schematically.

As shown in FIG. 9, each roller assembly 50 comprises a pair of rollers 52 and 54 rotatably mounted upon a shaft 56 which is in turn supported on a bracket 58 which may be welded or otherwise suitably fixed to the frame cross member 36. Secured to the top of the frame cross member 36 are a pair of blocks 60 and 62 on opposite sides of the carriage 40 to prevent laterally shiftable movement of the carriage during its travel. Depending from the conveyor frame 30 intermediate opposite ends of the carriage 40, there is provided a motor mount 64 carrying an oscillatable motor 66 having a drive shaft 68 to which there is affixed a laterally extending arm 70. Adjacent the free end of the arm 70 is mounted a roller 72 which rides in a vertical way defined by members 74 and 76, which are secured at their upper ends to carriage 40. Limit switches L-1 and L-2 are positioned to be actuated by arm 70 as it swings through its travel of 180-degrees from its position shown in FIG. 1B at 70 to its position shown at 70'. Oscillation of the arm 70 between said positions serves to reciprocate the carriage 40 in a manner which is known in the prior art.

Figure 3:
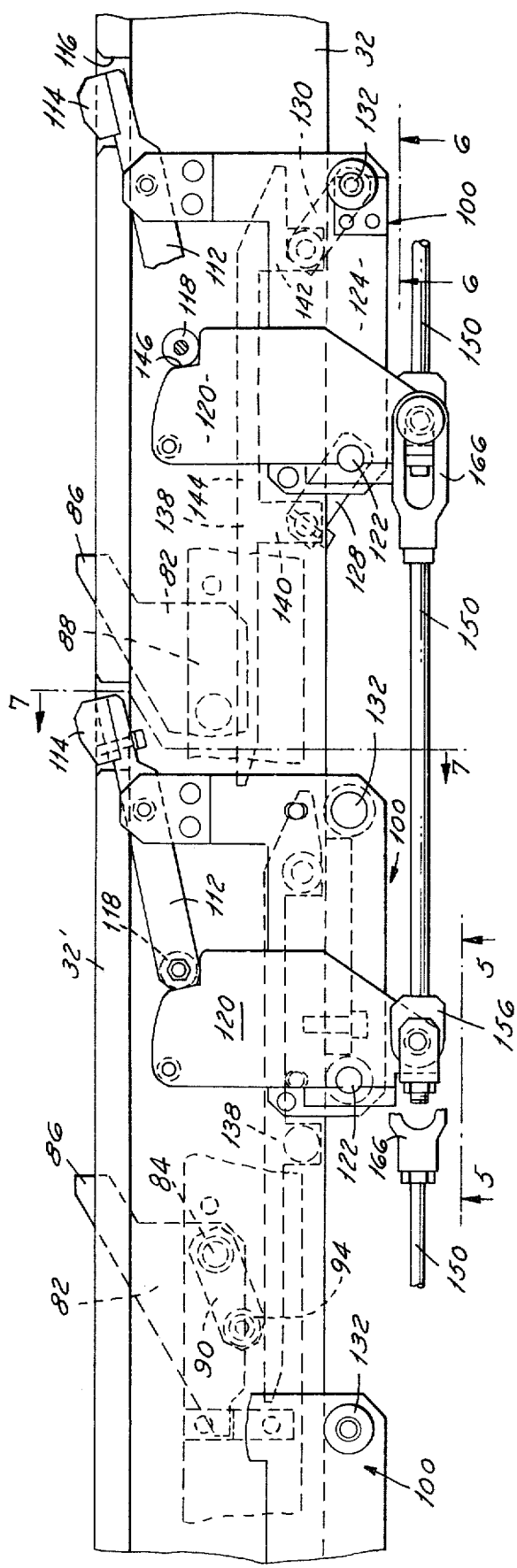
FIG. 3 is a partial enlarged side elevation of the conveyor showing details of construction.

As can be seen from FIGS. 1A and 1B, the conveyor shown defines a plurality of article supporting stations spaced apart longitudinally along the conveyor, the articles A being depicted in each of the article supporting stations. Associated with each article supporting station, and operable to transfer articles between adjacent stations, is a pusher assembly 80. Each pusher assembly 80 comprises a pusher dog 82 which is pivotally mounted upon a shaft 84 extending between and journalled at opposite ends in the opposed carriage side members 42 and 44, as shown most clearly in FIGS. 4 and 7. The configuration of the pusher member is shown in FIG. 3, and includes an article engaging portion 86, and a counterweight portion 88. Referring to FIGS. 3 and 4, it can be seen that the pusher dog is pivoted about the shaft 84 whereby the counterweight portion 88 tends to pivot the dog in a counterclockwise direction as shown in FIG. 3, the dog being supported on a carriage web 46 (FIG. 4). Therefore, the pusher dog is normally gravity-biased against the web 46, which retains it in its operative or article engaging position shown in FIG. 3.

In the position of the drive means shown in FIG. 1B, each pusher member 82 is positioned slightly upstream of one of the articles A in an article supporting station, and actuation of the drive means operates to shift all of the pushers 82 in a downstream direction, thereby transferring each article to the next successive downstream supporting station. Upon return of the transfer mechanism, each pusher dog 82 abuts against the underside of an article A, and is thereby pivoted about its axis 84, bypassing the article as it returns to its upstream position ready for the next article transfer movement. Each pusher assembly 82 includes an arm 90 fixed to the shaft 84 and projecting laterally therefrom, and carrying at its free end a pin 92 upon the end of which is rotatably mounted a roller 94, the purpose of which will be described hereinafter.

Associated with each article supporting station is a pusher actuating assembly operable to pivot a respective pusher to its non-article engaging or inoperative position. Such assembly includes a generally L-shaped plate 100 having an upstanding leg 102 and a horizontal leg 124, the plate being secured to the rail 32 as by bolts or the like 104. A bracket 106 is secured to the leg 102 as by bolts 108, and together with the leg supports a shaft 110 upon which is pivotally mounted an article position sensor 112. One end of the sensor 112 is provided with a wear pad 114 which projects through a cutout 116 in the article supporting rail 32, the pad 114 being normally positioned above the upper surface of the rail 32. The opposite end of member 112 is provided with a roller 118 which engages a cam actuator member 120, which is pivotally mounted on an axle 122 to the horizontal leg 124 of the plate 100.

The axle 122 extends rotatably through the plate 100 and therebeyond through a bearing member 126 which is secured as by welding to the plate 100. Mounted on the other end of the axle 122 is a crank arm 128 which is one of a pair, the other crank arm 130 being mounted on a shaft 132 journalled in a bushing 131 welded to the plate 100 (see FIG. 6). The opposite end of shaft 132 is provided with an enlarged end 133 and is held against axial shifting by a stop plate 135 fixed by a screw 137 to plate 100.

Each crank arm 128 and 130 is provided with a laterally projecting stub axle and bearing 134 and 136 respectively. An elongate, generally horizontal cam track 138 has a pair of depending feet 140 and 142 journalled on the bearings 134 and 136 respectively, the cam track having an upper flat surface 144 which underlies the roller 94 and is engageable therewith.

The cam actuator 120 is provided with a notch or cutout 146 into which the roller 118 on the end of member 112 interfits, interengagement of the roller and cutout serving to retain the cam actuator 120 in its upright position shown in FIGS. 1B and 3. In this position, the cam track 138 is in its lowered position allowing the pusher dog 82 to be gravity-biased in a counterclockwise direction, disposing its pusher portion 86 above the surface of the article supporting rails 32 and 34.

When an article A enters one of the conveyor stations, the article will engage the pad 114 of sensor 112, pivoting the sensor in a clockwise direction, thereby releasing roller 118 from cutout 146 in cam actuator 120. This action will permit the actuator 120 to pivot about its axis 122 by gravity in a clockwise direction, thereby also swinging crank arms 128 and 130 clockwise, raising cam track 138 into engagement with roller 94. As the cam track 138 is raised, roller 94 is also raised, pivoting pusher 82 in a clockwise direction and thereby swinging its article engaging portion 86 to an inoperative position spaced below the upper surface of the article support rails 32 and 34. With the parts in this position, reciprocation of the pusher 82 by the drive motor 66 will not result in transfer of an article A out of the station, because the pusher dog will be disposed below the article as it reciprocates.

It is to be understood that the conveyor is to be operable to fill each of the stations therealong with an article A, and to transfer such articles successively to the processing machine 30 upon demand. Assuming that the conveyor is full of articles, and that the processing machine 30 is operating, the conveyor will continue to transfer articles successively to the processing machine, each article being transferred from one station to the next station during each cyclical movement of the transfer mechanism.

In the event the operation of the processing machine is interrupted, the conveyor will automatically stop, assuming that each station has an article in it. In the event the processing machine is stopped, and the conveyor is not completely filled with articles, the conveyor will continue to operate until all stations therealong are full. The conveyor will operate to fill each of the article supporting stations, irrespective of which of the stations are empty.

To accomplish the above recited control function, each adjacent pair of cam acutators 120 is connected together by a control rod 150. The cam actuator at the downstream end of the conveyor is connected by a master control rod 152 to a reciprocable fluid pressure motor 154. As most clearly shown in FIG. 5, the upstream end of each control rod 150 has an apertured block 156 welded thereto through which extends a pin 158. A generally L-shaped retainer 160 overlies the block 156, and is secured to the cam actuator 120 by a cone-point screw 162 and nut 164. The inner end of the screw 162 engages a recess in the pin 158 to lock the actuator 120 and the pin 158 together for conjoint movement. The downstream end of each control rod 150 has a block 166 fixed thereto, the block having an elongate slot 168 through which projects the pin 158 of the adjacent control rod, the pin being provided with an enlarged head 170 to prevent disengagement.

Referring to FIGS. 1B and 2, when the processing machine 30 is in operation, the fluid pressure motor 154 is actuated to retract its piston rod 152, the outer end of which is connected to the pin 158 of the farthest down stream pusher actuating assembly (Fig. 1B). In this position of the piston rod 152, the cam actuator 120 is constrained against movement about its axis 122 irrespective of sensor 112 movement by an article in the station. All of the rods 150 will be held in like fashion, and therefore none of the actuators 120 can move, and consequently all pushers remain in article-engaging position to transfer articles. Thus each article will be moved to the next station during each cycle of conveyor operation as long as processing machine 30 is operating and motor 154 is actuated.

In the event the processing machine is shut down, fluid pressure will be immediately removed from motor 154 through a suitable control (not shown), permitting rod 152 to be extended. If at that time there is an article A in the last conveyor station, sensor 112 will be shifted thereby, disengaging roller 118 from actuator 120 (FIG. 1B). As master control rod 152 can now be extended, actuator 120 can pivot about its axis 122, carrying rod 152 and pin 158 with it to the left, thereby raising associated cam track 144 (FIG. 3) to pivot the pusher member 82 to its inoperative position as hereinabove described.

If all of the conveyor stations are occupied by articles, it will be apparent that all sensors 112 will be depressed by articles, and therefore all of the actuators 120 will be released to shift the pushers to their inoperative position through the linkage and cam track 144. However, if any one of the article stations is empty, its sensor will not be depressed, and its associated actuator therefore will not be released. All pusher dogs upstream of the vacant station will remain in their operative position, and on the next cycle of operation, each will be shifted, filling the vacant station. This type of operation will continue until all stations are full.

As can be seen from FIGS. 1A, 1B and 2, two additional article sensors are provided on the side of the conveyor opposite the sensors 112. Sensor 112A at the upstream end of the conveyor is operably coupled to the mechanism 26 to signal the latter through a suitable limit switch (not shown) when the article station at the upstream end of the conveyor is empty. Sensor 112B is provided to sense the presence of an article in the last conveyor station, and is coupled with switching means (not shown) on the processing machine 30 to control delivery of the article in the last station to the machine.

Shown in FIGS. 11-13 is an article movement sensing device which is mounted on the inwardly facing side of one of the side rails, in this case the rail 34, i.e. the rail opposite the mechanism above described. The device shown comprises an elongate supporting bar 200 and a strip 202 extending in spaced parallel relation, the upper bar 200 being fixedly secured to the rail 34 as by screws or the like 204. Between each of the article supporting stations, a finger 206 is pivotally mounted on the bar 200 as by a pin 208, and each finger is in turn pivotally secured to the lower strip 202 on a pin 210. The lower strip 202 is suspended on the pivot pins 210, while the upper ends of the fingers 206 project above the upper surface of rail wear bar 34'.

Article movement as shown in FIG. 11 is from left to right. At the upstream end of the conveyor, adjacent the free end of strip 202, there is mounted a limit switch 212 having an actuating arm 214 projecting therefrom with a roller 216 on the end of the arm. The switch assembly may be secured to the rail 34 by a bracket or the like 218, and is positioned to dispose the roller 216 in aligned confrontation with the adjacent finger 206', which has a depending extension 220 for contacting the roller.

As can be observed from a consideration of FIGS. 11-13, whenever an article is transferred between stations anywhere along the length of the conveyor, one of the fingers 206 will be be contacted by the article during its movement, thereby pivoting the finger clockwise about its pivot 208. Because all of the fingers 204 are interconnected by the strip 202, the movement of one finger will be transmitted to all of the fingers, including finger 206', pivotal movement of which causes its extension 220 to abut switch roller 216 to swing arm 214, actuating the switch 212. Thus the switch will be actuated during each cycle of conveyor operation during which even a single article is transferred.

Switch 212 is connected into the conveyor control circuit governing the drive motor 66 so that each actuation of the switch 212 will cause initiation of the next successive cycle of conveyor operation. Therefore, if article transfer occurs during any given cycle of operation, closure of switch 212 will cause the conveyor to cycle one more time. On the other hand, if no article movement occurs, as would be the case when all article supporting stations are full and the processing machine 30 is shut down, switch 212 will not be actuated, and the conveyor will shut down. The device shown in FIGS. 11-13 thus will ensure complete filling of the conveyor after machine 30 is shut down, but will automatically shut the conveyor down as soon as it is filled with articles. Also, in the event article supply is interrupted from source 26 with machine 30 shut down, all available articles will be transferred to the downstream end of the conveyor, and then it will no longer operate. If for any reason the supply of articles is interrupted and the conveyor becomes empty, it will shut down, irrespective of the fact that the processing machine 30 is still calling for articles, i.e. fluid pressure motor 154 is actuated.

Thus it can be seen that the conveyor shown operates in a very simple manner with a minimum of parts to accumulate articles and to feed the articles successively to their point of use, in this example, the processing machine 30. The conveyor operates completely automatically without any complicated or sophisticated equipment, article position and article movement being determined by strictly mechanical devices which operate positively. No reliance is placed upon complicated electronic and/or pneumatic controls. While no specific control circuit for the drive motor, switches and fluid pressure motor has been specifically detailed, the circuitry is extremely simple, and will be obvious to one with even rudimentary skill in the art.

What is claimed is:

1. An accumulating conveyor mechanism comprising, in combination:

a base;

elongate article support means mounted in stationary relation upon said base and providing a plurality of article supporting stations spaced uniformly apart therealong;

a transfer carriage mounted for limited reciprocating movement with respect to said support means;

drive means coupled to said carriage for reciprocating the same;

a plurality of pusher members movably mounted on said carriage for transferring articles between said stations, each pusher member being biased to an article engaging position and shiftable to a non-engaging position;

cam means movably engageable with each pusher member for shifting it to said non-engaging position, said cam means including a cam track for engaging said pusher member and further including a counter-weight biasing said track in a direction urging the pusher member to its non-engaging position; an article sensor at each supporting station comprising a movable arm having a first portion normally projecting into the path of an article in a station and a second portion releasably inter-engaging said counter-weight, with said arm being shifted by an article in said station to release said counter-weight and thereby actuate said cam to shift the track in a direction urging the pusher member to its non-engaging position.

2. The invention defined by claim 1 characterized by means inter-connecting adjacent cam means for preventing movement of a cam means in any given station in the absence of actuation of the article sensor in a station downstream from said given station.

3. An accumulating conveyor mechanism as defined in claim 2 characterized in that said means interconnecting adjacent cam means includes a master member at the downstream end of said conveyor for preventing movement of all of said cam means irrespective of sensor actuation.

4. An accumulating conveyor mechanism as defined in claim 3 characterized in that said master member is selectively shiftable to an inoperative position allowing cam means actuation.

5. An accumulating conveyor mechanism as defined in claim 2 characterized in that each of said pusher members is pivotally mounted on said carriage and is gravity biased to said article engaging position.

6. An accumulating conveyor mechanism as defined in claim 2 characterized in that said means interconnecting adjacent cam means comprises a rigid control rod extending between each pair of adjacent cam means pivotally connected to the upstream cam means and connected to the downstream cam means by a lost motion connection.

7. An accumulating conveyor mechanism as defined in claim 6 characterized in that said interconnecting means includes a master control rod connected to the cam means at the downstream extremity of said conveyor, and motive means coupled to said rod for shifting it between a cam retaining position and a cam release position.

8. An accumulating conveyor mechanism comprising, in combination:

a base;

elongate article support means mounted in stationary relation upon said base and providing a plurality of article supporting stations spaced uniformly apart therealong;

a transfer carriage mounted for limited reciprocating movement with respect to said support means;

drive means coupled to said carriage for reciprocating the same;

a plurality of pusher members movably mounted on said carriage for transferring an article between said stations when required and inoperable to transfer an article when not required;

article movement sensors positioned between adjacent article supporting stations and actuatable by an article moving between said stations;

control rod means extending along the conveyor and connected to said sensors to be shifted longitudinally in response to shifting of any one or more of the sensors;

and control means for controlling operation of the drive means and responsive to longitudinal shifting of the control rod means to initiate operation of the drive means to reciprocate the transfer carriage through a successive operating cycle but not initiate operation of the drive means upon failure of movement of the control rod means.

9. An accumulating conveyor mechanism as defined in claim (8) 8 characterized in that said article movement sensors each comprise a pivotally mounted finger projecting into the path of articles on said support means, (an elongate member) and said control rod means is pivotally interconnected to all of said fingers for movement in response to actuation of any one of the fingers by a moving article(,). (and switch means actuatable by movement of said elongate member.)

* * * * *